(12) United States Patent
Onose et al.

(10) Patent No.: US 8,257,000 B2
(45) Date of Patent: Sep. 4, 2012

(54) DRILL

(75) Inventors: Junya Onose, Tochigi-ken (JP);
Hiroyuki Fukushima, Tokyo (JP);
Masahiro Hakozaki, Kodaira (JP);
Shigemitsu Nomura, Saitama (JP);
Takayuki Konno, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1056 days.

(21) Appl. No.: 12/172,744

(22) Filed: Jul. 14, 2008

(65) Prior Publication Data

US 2009/0016832 A1 Jan. 15, 2009

(30) Foreign Application Priority Data

Jul. 12, 2007 (JP) ................................. 2007-183066
Jul. 12, 2007 (JP) ................................. 2007-183067
Jul. 12, 2007 (JP) ................................. 2007-183068

(51) Int. Cl.
*B23B 51/02* (2006.01)
(52) U.S. Cl. .......................................... 408/59; 408/230
(58) Field of Classification Search ................. 408/144, 408/227, 229, 230, 57, 59; *B23B 51/00, B23B 51/02*
See application file for complete search history.

(56) References Cited

U.S. PATENT DOCUMENTS

| | | | | |
|---|---|---|---|---|
| 319,614 A | * | 6/1885 | Pendleton | 408/230 |
| 496,253 A | * | 4/1893 | Federschmidt | 408/59 |
| 2,348,874 A | * | 5/1944 | Andreasson | 408/57 |
| 2,370,706 A | * | 3/1945 | Andreasson | 408/230 |
| 3,237,488 A | * | 3/1966 | Parone et al. | 408/230 |
| 3,598,500 A | * | 8/1971 | Oxford, Jr. | 408/210 |
| 4,583,888 A | * | 4/1986 | Mori et al. | 408/59 |
| 4,826,364 A | * | 5/1989 | Grunsky | 408/59 |
| 5,350,261 A | * | 9/1994 | Takaya et al. | 408/229 |
| 5,478,176 A | * | 12/1995 | Stedt et al. | 408/59 |
| 5,486,075 A | * | 1/1996 | Nakamura et al. | 408/230 |
| 5,704,740 A | * | 1/1998 | Ebenhoch et al. | 408/59 |
| 5,800,101 A | | 9/1998 | Jindai et al. | |
| 5,807,039 A | * | 9/1998 | Booher et al. | 408/224 |
| 6,030,155 A | * | 2/2000 | Scheer et al. | 408/59 |
| 6,565,296 B2 | * | 5/2003 | McKinley et al. | 408/224 |
| 7,101,125 B2 | * | 9/2006 | Borschert et al. | 408/230 |
| 7,306,411 B2 | | 12/2007 | Mabuchi et al. | |
| 7,422,396 B2 | | 9/2008 | Takikawa | |
| 7,476,067 B2 | | 1/2009 | Borschert et al. | |

FOREIGN PATENT DOCUMENTS

| | | | |
|---|---|---|---|
| JP | 53-38953 | | 9/1978 |
| JP | 61-35715 | | 3/1986 |
| JP | 08155713 A | * | 6/1996 |
| JP | 09-011015 A | | 1/1997 |
| JP | 11-309616 | | 11/1999 |

(Continued)

*Primary Examiner* — Daniel Howell
(74) *Attorney, Agent, or Firm* — Arent Fox LLP

(57) ABSTRACT

A drill includes a blade portion provided with spiral cutting blades along a cutting direction from a tip end to a rear end, and a shank portion formed consecutively on a rear side of the blade portion. The blade portion includes distal-side cutting blades provided from the distal end of the blade portion along the cutting direction and angled at a constant first torsion angle, intermediate grooves formed at a variable torsion angle that varies gradually from the first torsion angle to a second torsion angle, and rear-side grooves formed at the constant second torsion angle. The rear-side grooves are longer than the distal-side cutting blades in the cutting direction, and the second torsion angle is greater than the first torsion angle.

2 Claims, 11 Drawing Sheets

FOREIGN PATENT DOCUMENTS

| | | | | |
|---|---|---|---|---|
| JP | 2000263307 A | * | 9/2000 | |
| JP | 2001105218 A | * | 4/2001 | |
| JP | 2003-053610 | | 2/2003 | |
| JP | 2003-181711 | | 7/2003 | |
| JP | 2004-195559 | | 7/2004 | |
| JP | 2004195561 A | * | 7/2004 | |
| JP | 2005177891 A | * | 7/2005 | |
| JP | 2005305610 A | * | 11/2005 | |
| JP | 2006-55941 | | 3/2006 | |
| JP | 2006-212722 | | 8/2006 | |
| JP | 2006-528078 | | 12/2006 | |
| JP | 2007-015073 | | 1/2007 | |
| JP | 2007015073 A | * | 1/2007 | |

* cited by examiner

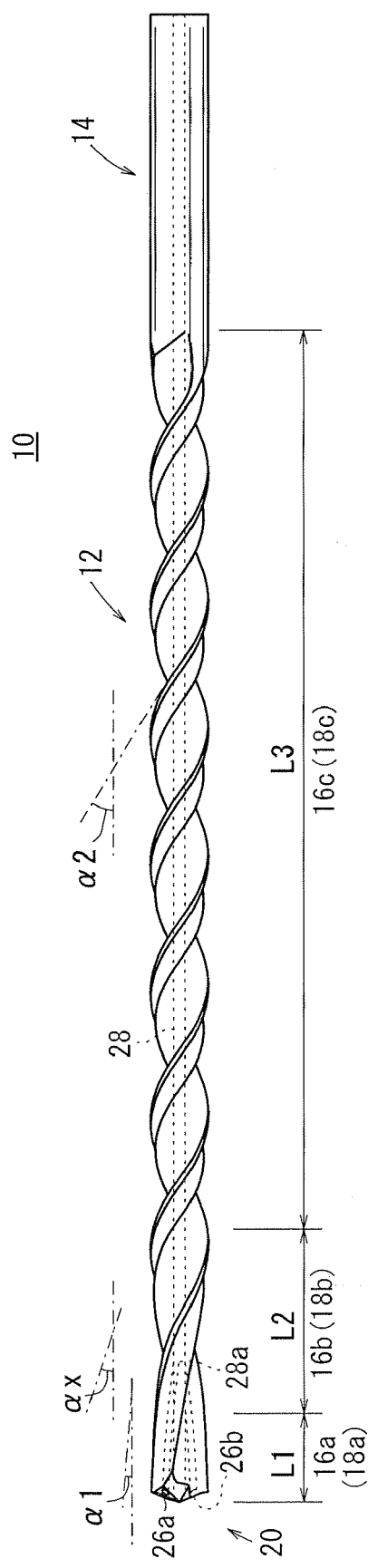
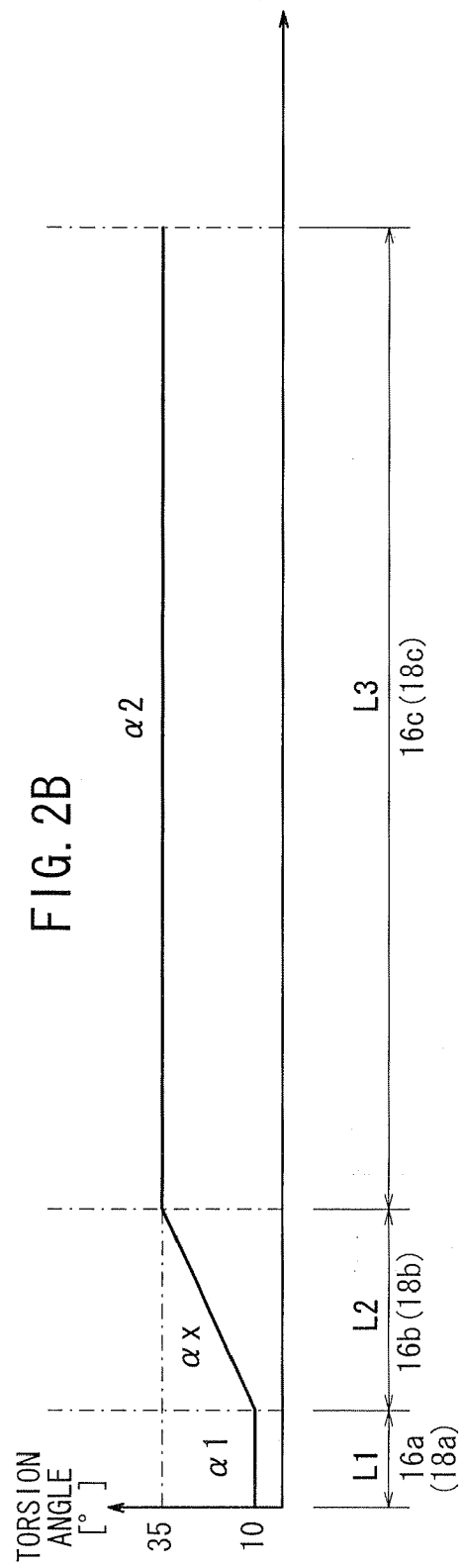

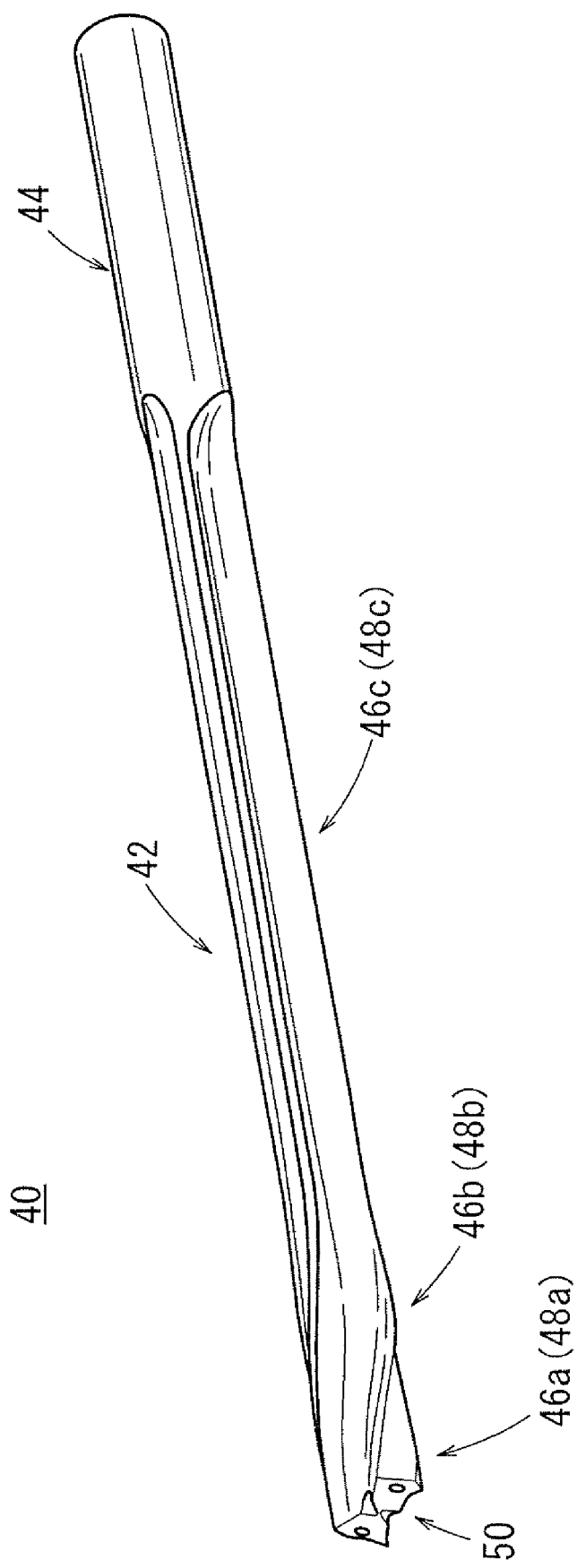

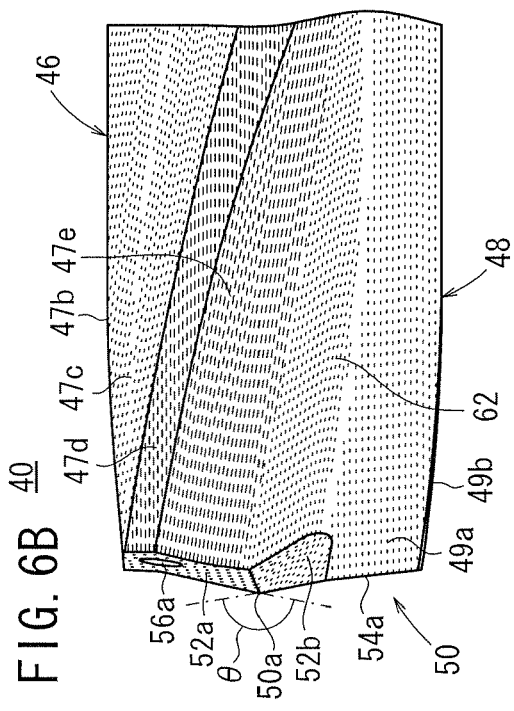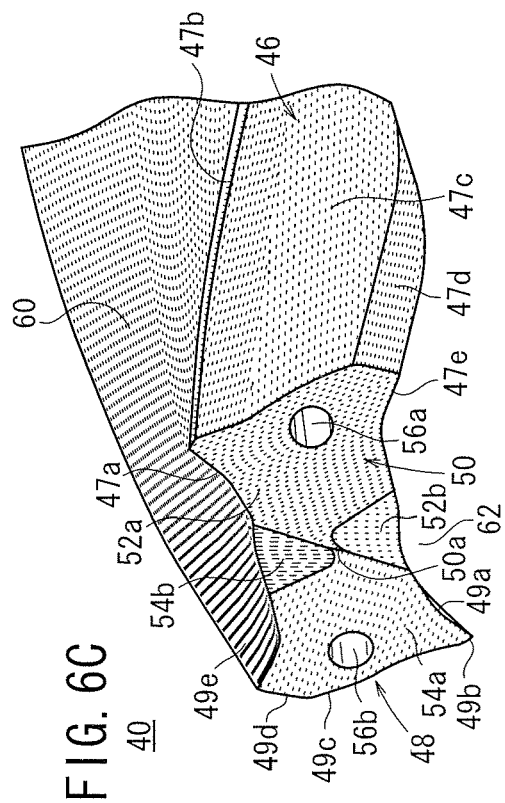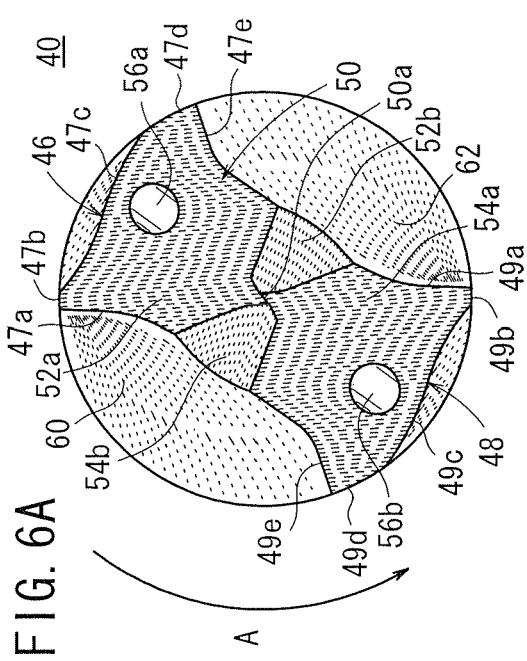
FIG. 6A
FIG. 6B
FIG. 6C

DRILL

BACKGROUND OF THE INVENTION

1. Field of the Invention

The present invention relates to a drill used, for instance, for drilling a hole in an engine component or the like.

2. Description of the Related Art

When aluminum-cast engine components requiring deep hole cutting are manufactured in sequence, a great load is applied on the drill utilized for cutting the components. Accordingly, a drill suitable for cutting a deep hole has conventionally been used during such processing.

Japanese Utility Model Publication No. 53-038953 discloses a drill suitable for performing deep hole processing on metals, where the torsion angle of the entirety or a part of a blade is consecutively changed, and the torsion angle on the distal side is greater than that on the rear end side of the blade. It is mentioned in this document that such an arrangement improves the bite of the drill as well as the rigidity of the drill.

A drill of this type exhibits a variety of scales of strength (e.g., bending strength, rigidity), cutting resistance (cutting reaction force), swarf shapes, and swarf dischargeability, according to the measure of the torsion angle. Accordingly, the lifetime of the drill is influenced by the setting condition of the torsion angle. In particular, a drill used for drilling a deep hole on a workpiece initially having no holes therein is subjected to extremely great loads when drilling the hole in the workpiece. In addition, it is difficult for such a drill to discharge swarfs at a certain depth of the deep hole. Accordingly, the drill may be damaged and become clogged by swarfs.

On the other hand, another problem manifests itself when a workpiece with an existing hole is to be bored along the hole.

For instance, when aluminum-cast engine components are manufactured in sequence, the position of a hole provided on the engine component by casting, i.e., a so-called cast hole, may become deviated according to the casting accuracy. Accordingly, when such a cast hole is to be bored by a drill, the cutting direction (cutting position) of the drill may become misaligned with the cast hole. Such misalignment may cause a great load on the drill, thereby lowering the lifetime and processing accuracy of the tool.

In view of the above, the setting conditions of the torsion angle must be optimized for the drill that is used in processing the cast hole, so that damage to the drill and deterioration of processing accuracy can be avoided, even when the above misalignment occurs.

SUMMARY OF THE INVENTION

The present invention has been made in view of the above disadvantages. An object of the present invention is to provide a drill capable of reducing a load applied on the drill when, for instance, a deep hole is bored, thereby prolonging tool lifetime, and enabling swarfs to be smoothly discharged.

A drill according to an aspect of the invention includes a blade portion provided with a spiral cutting blade along a cutting direction from a tip end to a rear end of the blade portion, and a shank portion continuous with a rear end of the blade portion. The blade portion includes a distal-side cutting blade formed from the tip end of the blade portion along the cutting direction at a constant first torsion angle, an intermediate groove continuous with the distal-side cutting blade along the cutting direction, the intermediate groove gradually varying a torsion angle thereof from the first torsion angle to a second torsion angle along the cutting direction, and a rear-side groove continuous with the intermediate groove along the cutting direction at the second torsion angle, wherein the rear-side groove occupies a greater length in the cutting direction than the distal-side cutting blade.

According to the above arrangement, when a deep hole is bored in a workpiece, swarfs can efficiently be discharged from a depth of the deep hole. Thus, clogging of swarfs in the middle of the bored hole can effectively be prevented, and loads on the drill can be reduced, so that the tool lifetime can be prolonged. Further, since the swarf-discharging speed is improved at the rear-side groove, which is longer than the distal-side cutting blade, an increase in resistance due to swarf clogging can be prevented.

In the above aspect of the invention, it is preferable for a diamond to be provided on the tip end of the blade portion, since dischargeability of swarfs is further improved thereby, and abrasion resistance of the blade tip also is enhanced.

When the drill is provided with an oil passage, which axially penetrates the drill from the tip end to the rear end thereof, the oil passage constituting a single channel from the shank portion to a section provided with the intermediate groove, and which branches into two channels at the section provided with the intermediate groove, thereby opening at a tip surface of the blade portion at two positions, since only a single channel for the oil passage passes through the axial center of the drill, flow path resistance of the cutting oil within the oil passage can be lowered.

Further, when the length and torsion angle of the rear-side groove are set larger than the length and torsion angle of the distal-side cutting blade of the blade portion, the size of swarfs generated by the distal-side cutting blade can be reduced, and such swarfs can be discharged efficiently at the rear-side groove. Accordingly, when a deep hole is bored into a workpiece, since swarfs can be discharged efficiently from a depth of the deep hole, swarf clogging in the middle of the hole as the hole is being bored can effectively be prevented, and the load applied to the drill can be reduced, so that the tool lifetime can be prolonged.

On the other hand, when the torsion angle of the distal-side cutting blade is set greater than that of the rear-side groove, the drill can cut into the workpiece while exhibiting a low cutting resistance. Accordingly, when a cast hole formed on a workpiece is drilled, even if the axial direction of the drill becomes misaligned with the axial direction of the cast hole, the drill can enter straightly along the axial direction of the drill, and the drill is hardly influenced by the orientation of the cast hole. Accordingly, even when the casting accuracy of the cast hole is low, drilling can be conducted securely at a desired position, thereby obtaining high processing accuracy. Further, since oblique entering of the drill into the cast hole on account of such misalignment, which tends to cause bending and damage to the drill, can be effectively avoided, the tool lifetime can be prolonged.

The above and other objects features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2A is a side elevation of the drill shown in FIG. 1;

FIG. 2B is an illustration showing a change in a torsion angle of a blade portion of the drill shown in FIG. 1;

FIG. 4 is a perspective view showing a drill according to another embodiment of the present invention;

FIG. 6A is a front elevation of the drill shown in FIG. 5;

FIG. 6B is a partially omitted side elevation showing a distal side of the drill shown in FIG. 5 in an enlarged manner;

FIG. 6C is a partially omitted perspective view showing the distal side of the drill shown in FIG. 5 in an enlarged manner;

DESCRIPTION OF THE PREFERRED EMBODIMENTS

A preferred embodiment of a drill according to the invention will be described below in detail with reference to the attached drawings.

Figure 1:
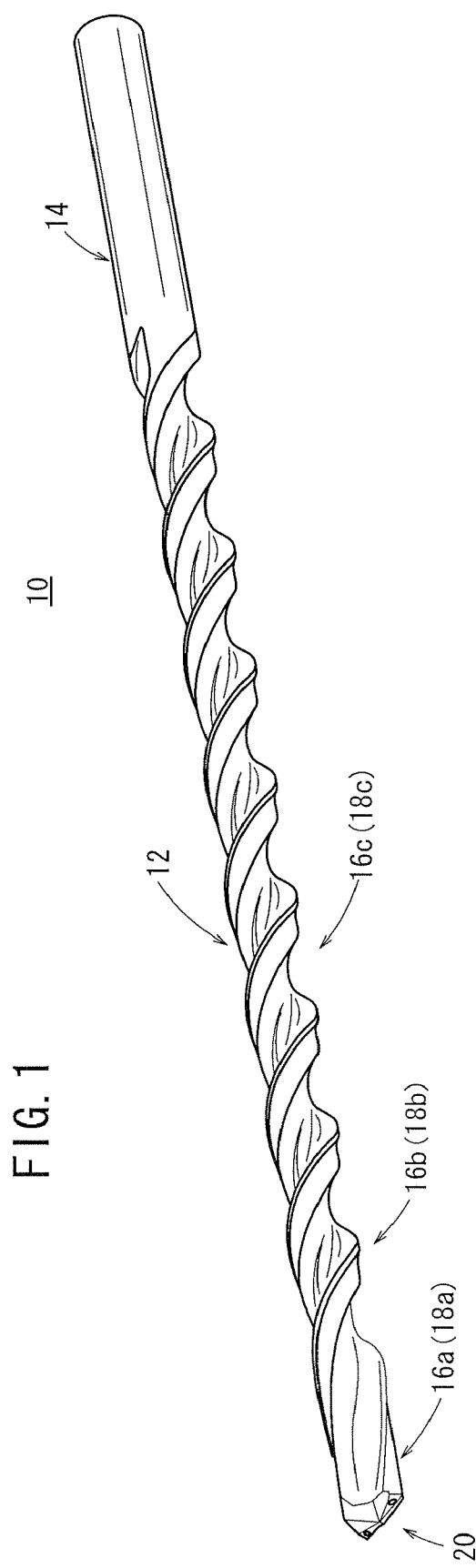
FIG. 1 is a perspective view showing a drill according to an embodiment of the present invention.

FIG. 1 is a perspective view showing a drill 10 according to a first embodiment of the present invention. FIG. 2A is a side elevation of the drill 10 shown in FIG. 1. FIG. 2B is an illustration showing a change in a torsion angle of a blade of the drill 10 shown in FIG. 1. The drill 10 according to the present embodiment is suitable for drilling a deep hole in a metal component (workpiece). The workpiece is, for instance, a cylinder block (aluminum-cast engine component). The deep hole herein refers to a hole having a depth five times or greater than an outer diameter of the drill, and for some cases in which the hole is quite deep, having a depth thirty times or greater than the outer diameter of the drill. Cutting such holes applies a great load on the drill (cutting tool). Incidentally, it should be understood that the drill 10 can also suitably be used for drilling a hole other than such a deep hole, e.g., a relatively shallow casting hole or the like.

As shown in FIGS. 1 and 2A, the drill 10 according to the present embodiment includes a blade portion 12 for cutting the workpiece and a shank portion 14 provided on a rear side of the blade portion 12. The shank portion 14 is held by a chuck or the like of a rotary drive source, which is provided on a machine tool (not shown) when the drill 10 is used.

Figure 3A:
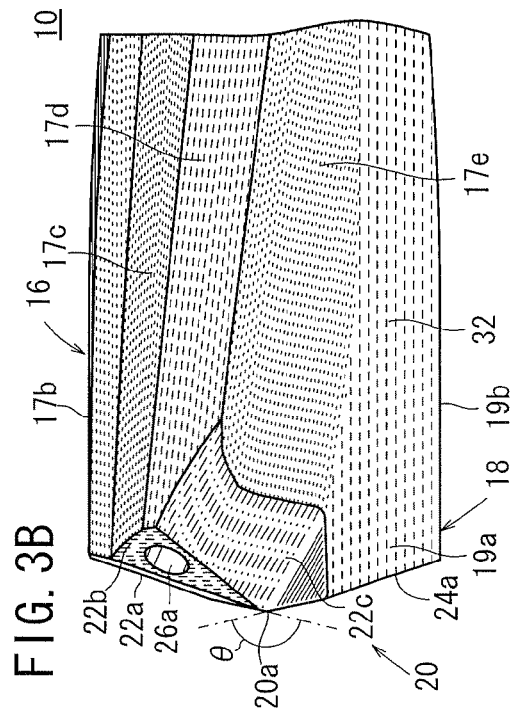
FIG. 3A is a front elevation of the drill shown in FIG. 2.

The blade portion 12 is provided with a first cutting blade 16 (16a, 16b, 16c) and a second cutting blade 18 (18a, 18b, 18c) extending in a spiral shape along a cutting direction (axial direction) from the distal side to the rear side of the drill 10. As shown in FIGS. 1, 3A and 3C, the cutting blades 16 and 18 extend in a spiral form, from the distal side to the rear side, in a symmetrical manner relative to the axial direction of the drill 10. The first cutting blade 16 includes a blade edge 17a located on a front side in a rotary direction of the drill 10 (the direction of the arrow A in FIG. 3A), a projection surface 17b continuous with a rear side of the blade edge 17a thereby defining an outer diameter surface of the drill 10, first and second inclined surfaces 17c and 17d continuous with the projection surface 17b, and a wall surface 17e bridging the second inclined surface 17d and a blade edge 19a of the second cutting blade 18. Similarly, the second cutting blade 18 is provided with a blade edge 19a, a projection surface 19b, a first inclined surface 19c, a second inclined surface 19d, and a wall surface 19e. Incidentally, as can be understood from FIG. 3A, in the cutting blades 16 and 18, a rake angle is provided on the blade edges 17a and 19a that enter into the workpiece.

Figure 3B:
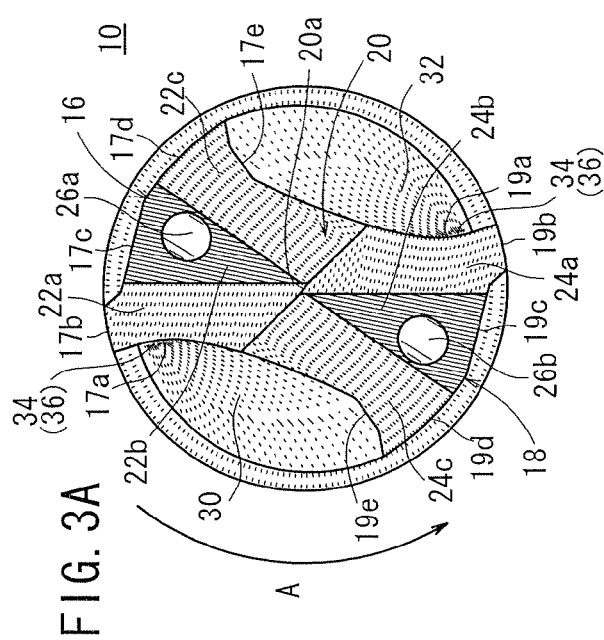
FIG. 3B is a partially omitted side elevation showing a distal side of the drill shown in FIG. 2 in an enlarged manner.
Figure 3C:
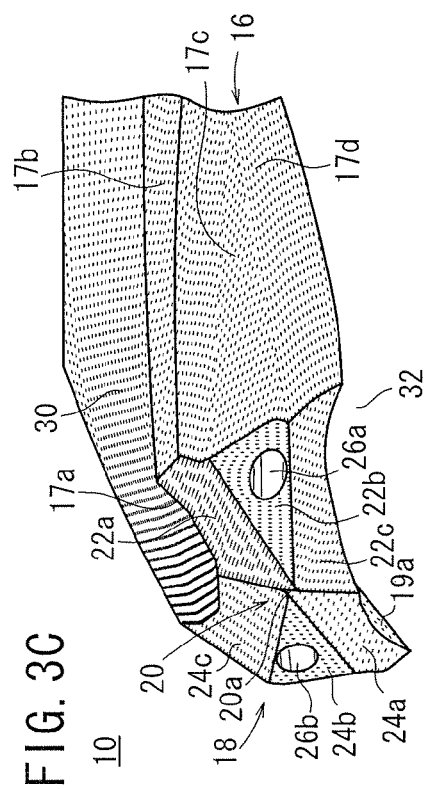
FIG. 3C is a partially omitted perspective view showing the distal side of the drill shown in FIG. 2 in an enlarged manner.

A tip surface 20 of the blade portion 12 is shaped in a pyramid around a tip (chisel point) 20a located on the leading edge of the drill 10 (see FIGS. 3B and 3C), which defines a circular sector of a predetermined central angle θ (for instance, 140°) around the tip 20a, when viewed in side elevation as shown in FIG. 3B. When the central angle θ is obtusely arranged, the cutting reaction force (radial reaction force) in a rotary direction of the drill 10 can be reduced. As can be recognized from FIGS. 3A and 3C, the tip surface 20 is constituted by a first tip inclined surface 22a, a second tip inclined surface 22b, and a third tip inclined surface 22c, which is inclined from the tip 20a toward the first cutting blade 16, along with a first tip inclined surface 24a, a second tip inclined surface 24b, and a third tip inclined surface 24c, which is inclined toward the second cutting blade 18 so as to define the above-mentioned pyramid. The tip inclined surfaces 22a to 22c and 24a to 24c are continuous with the cutting blades 16 and 18, respectively, at a predetermined angle.

Openings 26a and 26b are provided on the second tip inclined surfaces 22b and 24b, and are symmetrically provided on the tip surface 20 sandwiching the tip 20a therebetween (see FIGS. 3A and 3C). The openings 26a and 26b form tip-side openings of an oil passage 28, which penetrates axially through the drill 10 from the tip end to the rear side thereof. More specifically, as shown in FIG. 2A, the oil passage 28 axially penetrates through the drill 10 from an opening provided on the rear end of the shank portion 14, and branches into two passages (i.e., having a Y-shape) at a branch point 28a provided near the tip end, which communicate in turn with the openings 26a and 26b.

Further, swarf-discharging grooves 30, 32, for transferring swarfs from a workpiece cut by the blade edges 17a and 19a of the cutting blades 16 and 18 toward the shank portion 14 located at the rear side of the blade portion 12, are provided between the cutting blades 16 and 18 and extend in a spiral form on the blade portion 12. Specifically, as shown in FIG. 3A, the swarf-discharging groove 30 is defined by the blade edge 17a of the cutting blade 16 and the wall surface 19e of the cutting blade 18, so as to discharge swarfs cut mainly by the blade edge 17a. The swarf-discharging groove 32 is defined by the blade edge 19a of the cutting blade 18 and the wall surface 17e of the cutting blade 16, so as to discharge swarfs cut mainly by the blade edge 19a.

Incidentally, as discussed above, the inclination angle (i.e., so-called torsion angle) of the cutting blade 16 (18) relative to the axial direction of the drill 10 influences the strength (rigidity) thereof, such as the bending strength, swarf shape (size), and swarf dischargeability of the drill 10. Specifically, when the torsion angle is small, e.g., 0°-15° (referred to also as a "weak angle" hereinafter), although the drill exhibits great rigidity, the cutting resistance thereof increases. Further, although the swarf size is small, swarf dischargeability is lowered. On the other hand, when the torsion angle is large, e.g., 25°-45° (referred to also as a "strong angle" hereinafter), although the rigidity of the drill is small, the cutting resistance thereof decreases. Further, although the swarf size is large, swarf dischargeability is improved.

Accordingly, as shown in FIGS. 2A and 2B, the drill 10 of the present embodiment includes distal-side cutting blades 16a and 18a, angled at a constant first torsion angle $\alpha 1$ at a section from the tip end of the blade portion 12 over a distance L1 along the cutting direction, intermediate grooves 16b and 18b provided next to the rear side of the distal-side cutting blades 16a and 18a over a distance L2, which are angled at a variable torsion angle $\alpha x$ that varies gradually from the first torsion angle $\alpha 1$ to a second torsion angle $\alpha 2$ (an angle that is different from the first torsion angle $\alpha 1$), and rear-side grooves 16c and 18c provided next to the rear side of the intermediate grooves 16b and 18b over a distance L3, and which are angled constantly at the second torsion angle $\alpha 2$. Incidentally, as can be understood from FIG. 2A, the rear-side grooves 16c and 18c define a rear end of the blade portion 12, which is continuous with the shank portion 14. Accordingly, the cutting blade 16 is constituted by the distal-side cutting blade 16a, which is angled constantly at the first torsion angle $\alpha 1$, a rear-side groove 16c, which is angled constantly at the second torsion angle $\alpha 2$, and the intermediate groove 16b connecting the distal-side cutting blade 16a and the rear-side groove 16c with the variable torsion angle $\alpha x$. The cutting blade 18 is arranged in the same manner.

Specifically, as can be understood from the graph in FIG. 2B showing the change in the torsion angle of the drill 10 according to the present embodiment, the first torsion angle $\alpha 1$ is set at a weak angle of approximately 0°-15° (10° in the present embodiment), the second torsion angle $\alpha 2$ is set at a strong angle of approximately 25°-45° (35° in the present embodiment), and the torsion angle $\alpha x$ is set at a variable angle, which varies within a range of approximately 0°-45° (10°-35° in the present embodiment). Further, the distance L1 of the distal-side cutting blades 16a and 18a, the distance L2 of the intermediate grooves 16b and 18b, and the distance L3 of the rear-side grooves 16c and 18c of the drill 10 satisfy a relationship of L1<L2<L3, wherein, for instance, the distance L2 is two to three times longer than the distance L1, and the distance L3 is approximately fifteen times longer than the distance L1.

Incidentally, as shown in FIG. 2A, the branch point 28a of the oil passage 28 is provided, for example, within the area of the distance L2 in which the intermediate grooves 16b and 18b are formed. It should be understood that the branch point 28a may also be provided within the area of the distance L1 in which the distal-side cutting blades 16a and 18a are provided, or at another arbitrary area. Further, a single oil passage 28 or two oil passages 28 may be continuously provided from the tip end to the rear end.

Functions and effects of the drill 10 according to the present embodiment constructed in the foregoing manner shall be described below.

Initially, a workpiece (not shown), for instance, an aluminum-cast cylinder block, is mounted on a machine tool (not shown) and the shank portion 14 of the drill 10 is rigidly attached to a rotary drive source of a machine tool via a chuck mechanism or the like. Then, the rotary drive source is driven to rotate the drill 10 at a high speed in the direction of the arrow A in FIG. 3A. Subsequently, the tip surface 20 of the drill 10 is brought into contact with a deep-hole cutting point on the workpiece, and the drill 10 is displaced along the axial direction thereof, so that the blade portion 12 starts cutting into the workpiece.

The cutting blades 16 and 18 provided on the blade portion 12 of the drill 10 of the present embodiment begin drilling a deep hole by the distal-side cutting blades 16a and 18a provided on the distal side. The intermediate grooves 16b and 18b and the rear-side grooves 16c and 18c of the drill 10 gradually enter into the workpiece, in accordance with the progress of the cutting process.

At this time, the distal-side cutting blades 16a and 18a of the drill 10 are angled at the first torsion angle $\alpha 1$ (weak angle). Accordingly, the distal-side cutting blades 16a and 18a exhibit high rigidity and excellent entering ability, even in the absence of a pilot hole such as a casting hole or the like, and thus the cutting blades can securely and stably enter into the workpiece. Further, swarfs generated by cutting with the distal-side cutting blades 16a and 18a are sufficiently small in size. Accordingly, even as the drill 10 gradually reaches into the depth of the hole, swarfs generated by cutting with the distal-side cutting blades 16a and 18a are forcibly discharged to the outside of the hole owing to the function of the torsion angle, which enlarges from the intermediate grooves 16b and 18b to the rear-side grooves 16c and 18c. This is because swarf dischargeability is enhanced in accordance with the measurement of the torsion angle.

Specifically, since the distal-side cutting blades 16a and 18a of the drill 10 can reduce the size of the swarfs owing to the weak first torsion angle $\alpha 1$, swarfs can be discharged easily and efficiently, even from deeply within the deep hole, to the outside of the deep hole, due to a synergetic high swarf dischargeability effect of the intermediate grooves 16b and 18b with the variable torsion angle $\alpha x$, and the rear-side grooves 16c and 18c with the strong second torsion angle $\alpha 2$. Especially, when a deep hole is drilled in a workpiece without a pilot hole such as a cast hole, since swarfs are generated in a large amount, the drill 10 according to the present embodiment can suitably be used. Further, since swarf-discharging efficiency can be improved by means of the drill 10, swarf clogging in the middle of the hole, which could damage the drill 10, can be effectively prevented. Accordingly, the load on the drill 10 can be reduced and the tool lifetime can be prolonged.

In the drill 10 according to the present embodiment, the distance L3 over which the rear-side grooves 16c and 18c are provided is sufficiently greater than the distance L1 over which the distal-side cutting blades 16a and 18a are provided. Accordingly, even when a deep hole is bored accompanied by a large amount of swarf production, swarfs can be transferred securely to the rear side (toward the shank portion 14) of the drill 10. This is because, while cutting the deep hole, a significant amount of cutting actually is conducted only at a part of the distal end side of the blade portion 12, while high swarf dischargeability is required for the majority of the drill 10 (i.e., except for the part at the distal end thereof) in order to smoothly transfer swarfs toward the entrance of the deep hole.

Further, since the rear-side grooves 16c and 18c are inserted into the hole after being bored to some extent by the distal-side cutting blades 16a and 18a and the intermediate grooves 16b and 18b, the rear-side grooves 16c and 18c are not damaged, so long as a moderate rigidity is secured thereto. Further, the strong second torsion angle $\alpha 2$ of the rear-side grooves 16c and 18c improves the swarf discharge speed, which prevents increases in resistance on account of swarf clogging. In addition, since the distance L3 over which the rear-side grooves 16c and 18c are provided is sufficiently longer than the distance L1 over which the distal-side cutting blades 16a and 18a are provided, the above-described increase in resistance on account of swarf clogging can be further prevented even more securely.

The torsion angle $\alpha x$ of the intermediate grooves 16b and 18b is successively changed so that the angle difference between the first torsion angle $\alpha 1$ of the distal-side cutting blades 16a and 18a and the second torsion angle α2 of the rear-side grooves 16c and 18c gradually is eliminated (see FIG. 2B). Accordingly, a rapid change in the characteristics of the blade portion 12 in the axial direction, on account of a difference in the torsion angle, can be restrained effectively. Consequently, the load applied to the drill 10 during drilling can be reduced, and the tool lifetime of the drill 10 can be further prolonged.

Incidentally, the drill 10 sometimes requires re-grinding at the distal side of the blade portion 12 after a plurality of cutting processes, or cutting of a hard material, have been performed. In this case, since the distal-side cutting blades 16a and 18a constituting the distal side of the cutting blades 16 and 18 are configured at a constant weak angle of the first torsion angle α1 over a sufficient distance L1, the characteristics of the distal-side cutting blades 16a and 18a, i.e., the shape and size of the produced swarfs during drilling, can effectively be prevented from changing after re-grinding, so that stable cutting characteristics can be constantly obtained.

Further, as described above, the oil passage 28 of the drill 10 is provided with the branch point 28a therein at a section where the intermediate grooves 16b and 18b are located. In other words, the oil passage 28 is provided in a single path within the axial center of the drill 10 extending over the majority of the drill 10 in the axial direction, i.e., the section covering the shank portion 14, the rear-side grooves 16c and 18c, and a portion of the intermediate grooves 16b and 18b. Accordingly, flow-path resistance (passage resistance) of the cutting oil within the oil passage 28 can be lowered, and restrictions on forming the torsional shape of the rear-side grooves 16c and 18c, having a strong second torsion angle α2, can be eliminated, thereby allowing the torsion thereof to be freely determined. Further, since the distal-side cutting blades 16a and 18a are angled at a weak first torsion angle α1, the Y-shaped configuration of the oil passage 28 from the branch point 28a toward the tip end can easily be formed. Further, since, as described above, the branch point 28a is provided at a position where the intermediate grooves 16b and 18b are located, it is not required to change the position of the openings 26a and 26b on the distal end of the oil passage 28, even after re-grinding, thereby effectively preventing changes from occurring in the oil supply characteristics of the section from the openings 26a and 26b to the cutting section, and thereby enhancing stable cutting performance.

The distal-side cutting blades 16a and 18a of the drill 10 may be attached with a cutting blade 34, which is formed of diamond particles, or the cutting blades 16a and 18a may be coated with a diamond coating 36. According to this arrangement, swarf dischargeability can be further improved, and abrasion resistance of the blade edge can be improved.

Next, a drill according to another preferred embodiment of the present invention shall be described below with reference to FIGS. 4 to 7.

A drill 40 according to the present embodiment is suitable for drilling a cast hole provided in a casting component (workpiece), for example. The workpiece, for instance, may be a cylinder block (aluminum-cast engine component). It should be understood that the drill 40 not only is applicable for cutting a cast hole, but may also suitably be used for drilling a hole on a metal component initially provided with no holes therein.

Figure 5A:
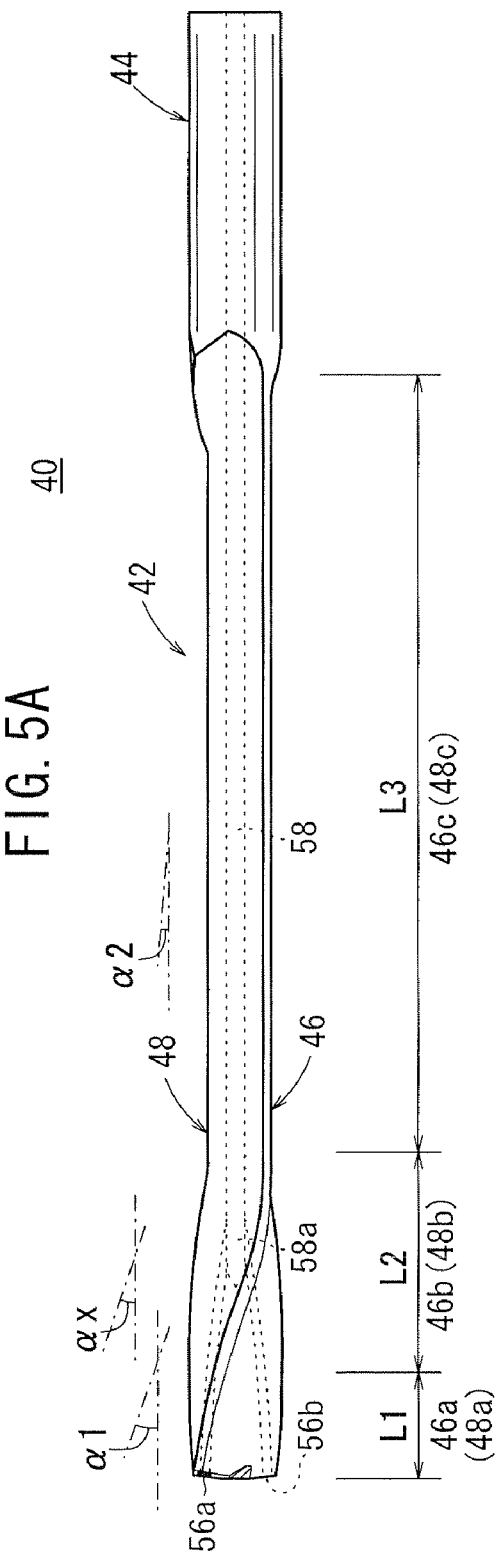
FIG. 5A is a side elevation of the drill shown in FIG. 4.

As shown in FIGS. 4 and 5A, the drill 40 according to the present embodiment includes a blade portion 42 for cutting the workpiece, and a shank portion 44 provided on a rear side of the blade portion 42.

The blade portion 42 is provided with a first cutting blade 46 (46a, 46b, 46c) thereon, and a second cutting blade 48 (48a, 48b, 48c) extending in a spiral form (and substantially linearly through the middle thereof in the present embodiment) along a cutting direction (axial direction) from the distal side of the drill 40 to the rear side. As shown in FIGS. 4, 6A and 6C, the cutting blades 46 and 48 extend from the distal side to the rear side, symmetrically relative to the axial direction of the drill 40. The first cutting blade 46 includes a blade edge 47a located on a front side in a rotary direction of the drill 40 (the direction of the arrow A shown in FIG. 6A), a projection surface 47b continuous with a rear side of the blade edge 47a so as to define an outer diameter surface of the drill 40, a first inclined surface 47c continuous with the projection surface 47b, a second inclined surface 47d continuous with the first inclined surface 47c so as to define the outer diameter surface of the drill 40, together with the projection surface 47b and a wall surface 47e that bridges the second inclined surface 47d and a blade edge 49a of the second cutting blade 48. Similarly, the second cutting blade 48 is provided by the blade edge 49a, a projection surface 49b, a first inclined surface 49c, a second inclined surface 49d, and a wall surface 49e.

Incidentally, as can be understood from FIG. 6A, in the cutting blades 46 and 48, a rake angle is provided on the blade edges 47a and 49a, which actually enter into the workpiece. Further, the circumferential width (so-called margin width) of the projection surfaces 47b and 49b of the drill 40 is set to be smaller than a conventional arrangement, thereby reducing cutting resistance (cutting torque) generated in the rotary direction (in the direction of the arrow A in FIG. 6A) of the drill 40. In addition, since the second inclined surfaces 47d and 49d function as a second margin portion, which is continuous with the projection surfaces 47b and 49b, straight running stability of the drill 40 is enhanced.

A tip surface 50 of the blade portion 42 is shaped in a pyramid around a tip (chisel point) 50a located on a leading edge of the drill 40 (see FIGS. 6B and 6C), which defines a circular sector having a predetermined central angle θ (for instance, 166°) around the tip 50a, when viewed in side elevation as shown in FIG. 6B. When the central angle θ is arranged obtusely, the cutting reaction force (radial reaction force) in the rotary direction of the drill 40 can be reduced. As can be recognized by FIGS. 6A and 6C, the tip surface 50 is constituted by first and second tip inclined surfaces 52a and 52b, which are inclined from the tip 50a toward the first cutting blade 46, and first and second tip inclined surfaces 54a and 54b, which are inclined toward the second cutting blade 48 so as to define the above-mentioned pyramid. The tip inclined surfaces 52a, 52b, 54a and 54b are continuous with the cutting blades 46 and 48, respectively, at a predetermined angle.

Symmetrical openings 56a and 56b are provided on the first tip inclined surfaces 52a and 54a, on the tip surface 50 sandwiching the tip 50a therebetween (see FIGS. 6A and 6C). The openings 56a and 56b constitute tip-side openings of an oil passage 58 that penetrates axially through the drill 40 from the tip end to the rear side end thereof. Specifically, as shown in FIG. 5A, the oil passage 58 penetrates axially through the drill 40 from an opening provided on the rear end of the shank portion 44. The oil passage 58 branches into two sections (i.e., in a Y-shape) at a branch point 58a, which is provided near the tip end and which communicates with the openings 56a and 56b.

Further, swarf-discharging grooves 60, 62, for transferring swarfs of the workpiece cut by the blade edges 47a and 49a of the cutting blades 46 and 48 toward the shank portion 44 located at the rear side of the blade portion 42, are provided between the cutting blades 46 and 48 extending in a spiral form on the blade portion 42. Specifically, as shown in FIG. 6A, the swarf-discharging groove 60 is defined by the blade edge 47a of the cutting blade 46 and the wall surface 49e of the cutting blade 48, so as to discharge swarfs cut mainly by the blade edge 47a. The swarf-discharging groove 62 is defined by the blade edge 49a of the cutting blade 48 and the wall surface 47e of the cutting blade 46, so as to discharge swarfs cut mainly by the blade edge 49a.

Incidentally, as discussed above, the inclination angle (i.e., so-called torsion angle) of the cutting blade 46 (48) relative to the axial direction of the drill 40 influences the strength (rigidity) of the drill 40, such as the bending strength, swarf shape (size) and the swarf-dischargeability of the drill 40. Specifically, when the torsion angle is small, e.g., 0°-15° (referred to as a "weak angle" hereinafter), although the drill provides great rigidity, the cutting resistance thereof increases. Further, although the swarf size is small, dischargeability of swarfs is lowered. On the other hand, when the torsion angle is large, e.g., 25°-45° (referred to as a "strong angle" hereinafter), although the rigidity of the drill is small, the cutting resistance of the drill decreases. Further, although the swarf size is large, dischargeability of swarfs is improved.

Figure 5B:
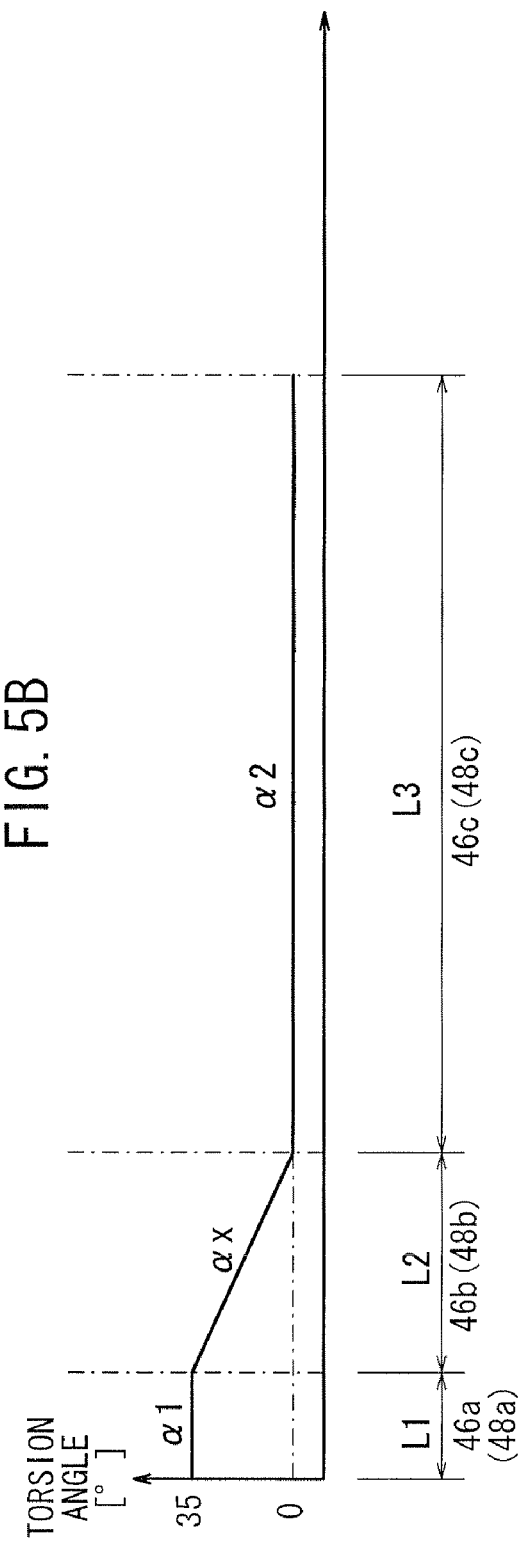
FIG. 5B is an illustration showing a change in a torsion angle of a blade of the drill shown in FIG. 4.

Accordingly, as shown in FIGS. 5A and 5B, the drill 40 of the present embodiment includes distal-side cutting blades 46a and 48a angled at a constant first torsion angle $\alpha 1$ at a section from the tip end of the blade portion 42 over a distance L1 along the cutting direction, intermediate grooves 46b and 48b provided next to the rear side of the distal-side cutting blades 46a and 48a, extending over a distance L2, and angled at a variable torsion angle $\alpha x$ that gradually varies from the first torsion angle $\alpha 1$ to a second torsion angle $\alpha 2$ (an angle different from the first torsion angle $\alpha 1$), and rear-side grooves 46c and 48c provided next to the rear side of the intermediate grooves 46b and 48b, extending over a distance L3, and angled at the constant second torsion angle $\alpha 2$. Incidentally, as can be understood from FIG. 5A, the rear-side grooves 46c and 48c define a rear end of the blade portion 42, which is continuous with the shank portion 44. Accordingly, the cutting blade 46 is provided by the distal-side cutting blade 46a, which is angled at the constant first torsion angle $\alpha 1$, a rear-side groove 46c, which is angled at the constant second torsion angle $\alpha 2$, and the intermediate groove 46b interconnecting the distal-side cutting blade 46a and the rear-side groove 46c with a variable torsion angle $\alpha x$. The cutting blade 48 is arranged in a similar manner.

Specifically, as can be understood from the graph in FIG. 5B, which shows the change in the torsion angle of the drill 40 according to the present embodiment, the first torsion angle $\alpha 1$ is set at a strong angle of approximately 25°-45° (35° in the present embodiment), the second torsion angle $\alpha 2$ is set at a weak angle of approximately 0°-15° (0° in the present embodiment), and the torsion angle $\alpha x$ is set at a variable angle within a range of approximately 45°-0° (35°-0° according to the present embodiment). Further, the distance L1 of the distal-side cutting blades 46a and 48a, the distance L2 of the intermediate grooves 46b and 48b, and the distance L3 of the rear-side grooves 46c and 48c of the drill 40 satisfy the relationship L1<L2<L3, wherein, for example, the distance L2 is two to three times longer than the distance L1, and the distance L3 is approximately fifteen times longer than the distance L1.

Incidentally, as shown in FIG. 5A, the branch point 58a of the oil passage 58 is provided, for example, within an area of the distance L2 in which the intermediate grooves 46b and 48b are formed. It should be understood that the branch point 58a may also be provided within the area of the distance L1, in which the distal-side cutting blades 46a and 48a are provided, or at another area. Further, a single oil passage 58 or two oil passages 58 may be continuously provided from the tip end to the rear end.

Functions and effects of the drill 40 according to the present embodiment arranged in the foregoing manner shall be described below.

Figure 7:
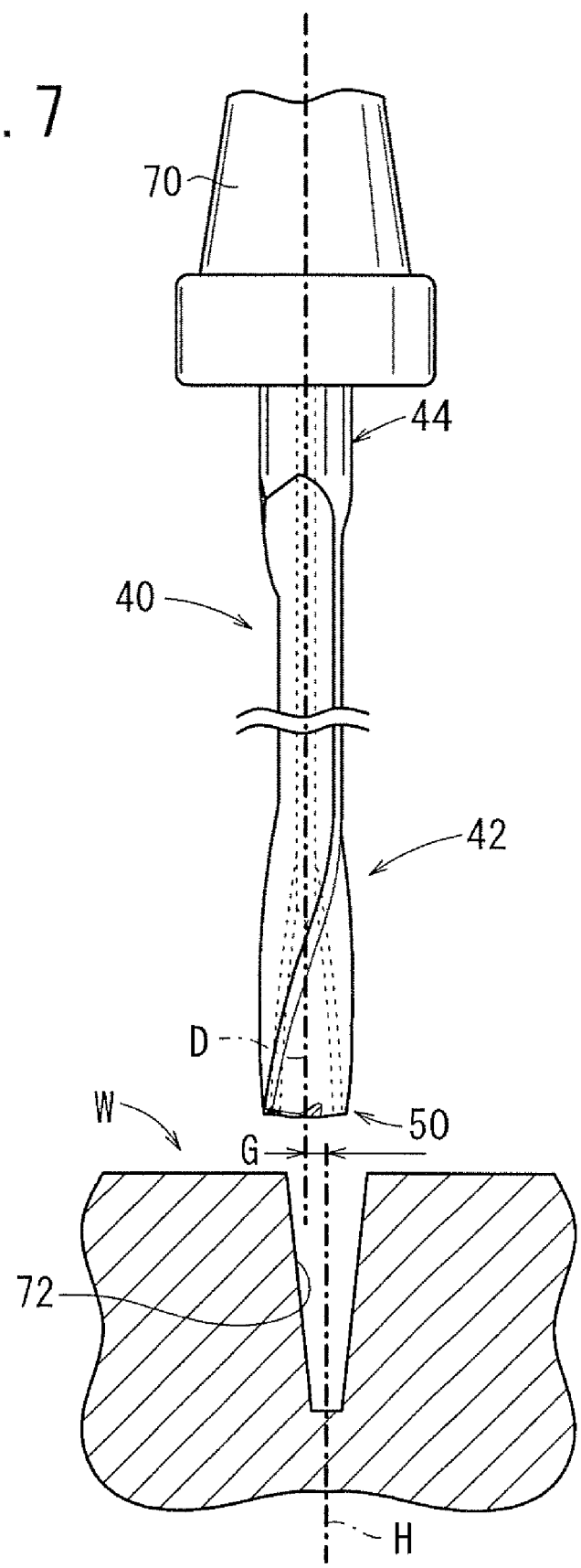
FIG. 7 is an illustration showing how a cast hole in a workpiece W is cut by the drill shown in FIG. 4.

Initially, as shown in FIG. 7, a workpiece W (an aluminum-cast cylinder block, for example) is mounted on a machine tool (not shown), and the shank portion 44 of the drill 40 is rigidly attached to a rotary drive source 70 of the machine tool via a chuck mechanism or the like. Then, the rotary drive source 70 is driven in order to rotate the drill 40 at a high speed in the direction of the arrow A in FIG. 6A. Subsequently, the tip surface 50 of the drill 40 is directed toward a cast hole 72 provided on the workpiece W, and the drill 40 is displaced along the axial direction thereof, so that the blade portion 42 begins cutting into the workpiece W.

The cutting blades 46 and 48 provided on the blade portion 42 of the drill 40 of the present embodiment start cutting the cast hole 72 by the distal-side cutting blades 46a and 48a, which are provided on the distal end of the drill 40, whereupon the intermediate grooves 46b and 48b and the rear-side grooves 46c and 48c are inserted into the workpiece W along a hole formed at a predetermined diameter around the cast hole 72.

At this time, since the distal-side cutting blades 46a and 48a of the drill 40 are angled at the first torsion angle $\alpha 1$ (strong angle) and are provided with a given rake angle, the distal-side cutting blades 46a and 48a can securely and stably enter into the cast hole 72 with low cutting resistance. Accordingly, as shown in FIG. 7, even when the axial direction D of the drill 40 is misaligned with the axial direction H of the cast hole 72 by a positional deviation G occurring within a tolerable range, the drill 40 can still enter the workpiece straightly along the axial direction H thereof, without being significantly influenced by the orientation of the cast hole 72. Accordingly, even when the casting accuracy of the cast hole 72 is low, drilling can be securely conducted at a desired position, thereby obtaining high processing (position) accuracy. Further, oblique entering of the drill 40 into the cast hole 72 due to the above-described positional deviation G, which tends to cause bending and damage to the drill, can be effectively avoided, so that the lifetime of the tool can be prolonged.

On the other hand, although swarfs of the workpiece W cut by the distal-side cutting blades 46a and 48a angled at the strong first torsion angle $\alpha 1$ tend to become relatively long and large as described above, since only a small amount of swarfs is generated when cutting a cast hole 72 provided in advance, such swarfs can easily be transferred to the intermediate grooves 46b and 48b as a result of a synergetic effect due to the high swarf-dischargeability of the intermediate grooves, so that swarfs can be securely discharged from the rear-side grooves 46c and 48c and outside of the hole.

In other words, the rear-side grooves 46c and 48c are provided with a weak second torsion angle $\alpha 2$, which is weak as compared with the distal-side cutting blades 46a and 48a having high swarf dischargeability, which results in inferior swarf-discharging performance of the rear-side grooves 46c and 48c. However, the cast hole 72 produces a smaller amount of swarfs, so swarfs do not clog the hole, and the swarfs are securely discharged to the outside of the hole. Further, since the swarf-discharging efficiency of the distal-side cutting blades 46a and 48a is high, swarf clogging within the depth of the hole, which could otherwise cause damage to the drill 40, can be effectively avoided, so that the load applied to the drill 40 can be reduced, and the lifetime of the tool can be further prolonged.

Further, the rear-side grooves 46c and 48c are provided with a constant weak second torsion angle $\alpha 2$, which in the present embodiment is 0°. Accordingly, the rear-side grooves 46c and 48c provide a so-called straight fluted drill that exhibits high rigidity. Accordingly, even when a positional deviation G is caused when cutting the cast hole 72, collision of the base portion of the drill 40, i.e., the rear-side grooves 46c and 48c, with the workpiece W around the opening of the hole, which otherwise would cause deformation or damage thereon during the cutting process, can effectively be prevented. This is because, while cutting of the cast hole 72 is conducted primarily by the distal-side cutting blades 46a and 48a, the majority of the hole remains in contact with the rear-side grooves 46c and 48c when the hole becomes deep.

The torsion angle $\alpha x$ of the intermediate grooves 46b and 48b successively changes, so that the angle difference between the first torsion angle $\alpha 1$ of the distal-side cutting blades 46a and 48a and the second torsion angle $\alpha 2$ of the rear-side grooves 46c and 48c gradually becomes eliminated (see FIG. 5B). Accordingly, a rapid change in the characteristics of the blade portion 42 in the axial direction, on account of differences in the torsion angle, can be restrained effectively. Consequently, the load applied during operation of the drill 40 can be reduced, and the tool lifetime of the drill 40 can be further prolonged.

Incidentally, the drill 40 sometimes requires re-grinding at the distal side of the blade portion 42 after a plurality of cutting processes, or cutting of a hard material, have been performed. In this case, since the distal-side cutting blades 46a and 48a constituting the distal sides of the cutting blades 46 and 48 are configured at a constant first torsion angle $\alpha 1$ over a sufficient distance L1, the characteristics of the distal-side cutting blades 46a and 48a such as the cutting resistance and the shape of the generated swarfs during drilling, can effectively be prevented from changing after re-grinding, so that stable cutting characteristics can be constantly obtained.

Further, as described above, the oil passage 58 of the drill 40 is provided with the branch point 58a therein at a section where the intermediate grooves 46b and 48b are located. In other words, the oil passage 58 is provided in a single path within the axial center of the drill 40 extending over the majority of the drill 40 in the axial direction, i.e., the section covering the shank portion 44, the rear-side grooves 46c and 48c, and a portion of the intermediate grooves 46b and 48b. Accordingly, flow-path resistance (passage resistance) of the cutting oil within the oil passage 58 can be lowered, and restrictions on forming the torsional shape of the rear-side grooves 46c and 48c, having the second torsion angle $\alpha 2$, can be eliminated, thereby allowing the torsion thereof to be freely determined. Further, since, as described above, the branch point 58a is provided at a position where the intermediate grooves 46b and 48b are located, it is not required to change the position of the openings 56a and 56b on the distal side of the oil passage 58, even after re-grinding, thereby effectively preventing changes from occurring in the oil supply characteristics of the section from the openings 56a and 56b to the cutting section, and thereby enhancing stable cutting performance.

The distal-side cutting blades 46a and 48a of the drill 40 may have a diamond cutting blade attached thereto, or may be coated with a diamond coating. According to this arrangement, swarf dischargeability can be further improved, and abrasion resistance of the blade edge can be improved.

Yet another preferred embodiment of the drill according to the present invention shall be described below with reference to FIGS. 8 to 10. The same components as those described in the above exemplary embodiments will be represented using the same reference numerals, and detailed descriptions of such features shall be omitted.

The first cutting blade 16 includes a cutting blade (blade edge) 80a located on a front side in the rotary direction of the drill 10 (the direction of the arrow A shown in FIG. 9), a land portion (margin portion) 80b continuous with the cutting blade 80a so as to define an outer diameter surface of the drill 10, a small-diameter escape portion 80c continuous with the land portion 80b and which is shorter than the land portion 80b in a radial direction of the drill 10, a pad portion 80d continuous with the escape portion 80c and which is larger than the escape portion 80c in the radial direction, an arc portion 80e continuous with the pad portion 80d and having approximately the same length as the escape portion 80c in the radial direction, and a wall surface 80f extending from the arc portion 80e to a cutting blade (blade edge) 82a of the second cutting blade 18. Similarly, the second cutting blade 18 is provided with a cutting blade 82a, a land (margin) portion 82b, an escape portion 82c, a pad portion 82d, an arc portion 82e, and a wall portion 82f. As shown in FIG. 9, the center of the pad portion 80d (82d) is shifted from the land portion 80b (82b) at a predetermined angle $\theta 1$ (e.g., 35°-55°, 45° in the present embodiment). Further, the pad portion 80d (82d) has a size equal to or smaller than the land portion 80b (82b) in the radial direction. This is because, if the pad portion 80d (82d) protrudes toward the outside of the drill 10 relative to the land portion 80b (82b), the pad portion 80d (82d) collides with the workpiece, which tends to cause cutting failures or the like.

Figure 8:
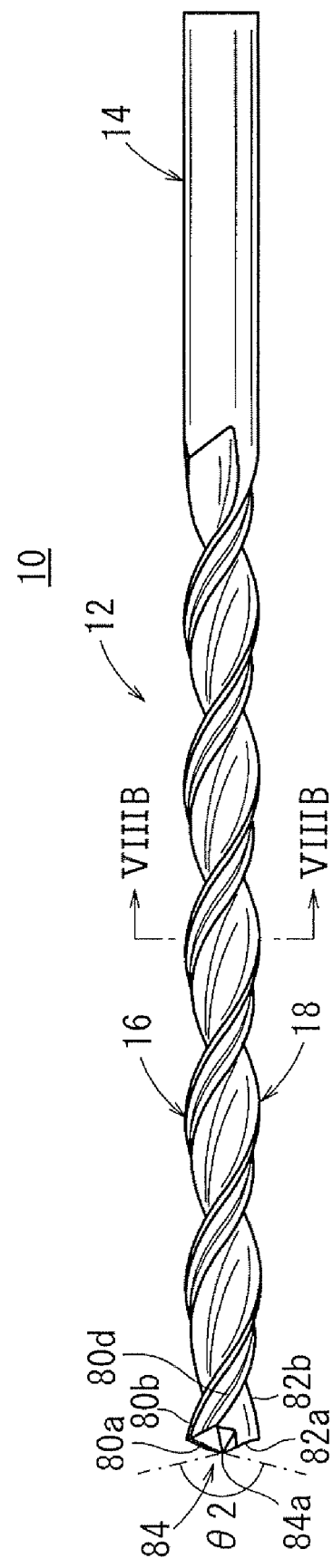
FIG. 8 is a schematic side elevation showing a drill according to another embodiment of the present invention.

A tip surface 84 of the blade portion 12 is provided in the shape of a pyramid around a cutting blade ridge (chisel edge) 84b, including a tip (chisel point) 84a, as the leading edge of the drill 10 (see FIGS. 8 and 9), which defines a sector having a predetermined central angle $\theta 2$ (166° in the present embodiment) around the tip 84a when viewed in side elevation as shown in FIG. 8. When the angle $\theta 2$ is arranged obtusely, the cutting reaction force (radial reaction force) in the rotary direction of the drill 10 can be reduced, and accordingly, the angle $\theta 2$ is preferably set, for instance, at 160° or more.

Figure 9:
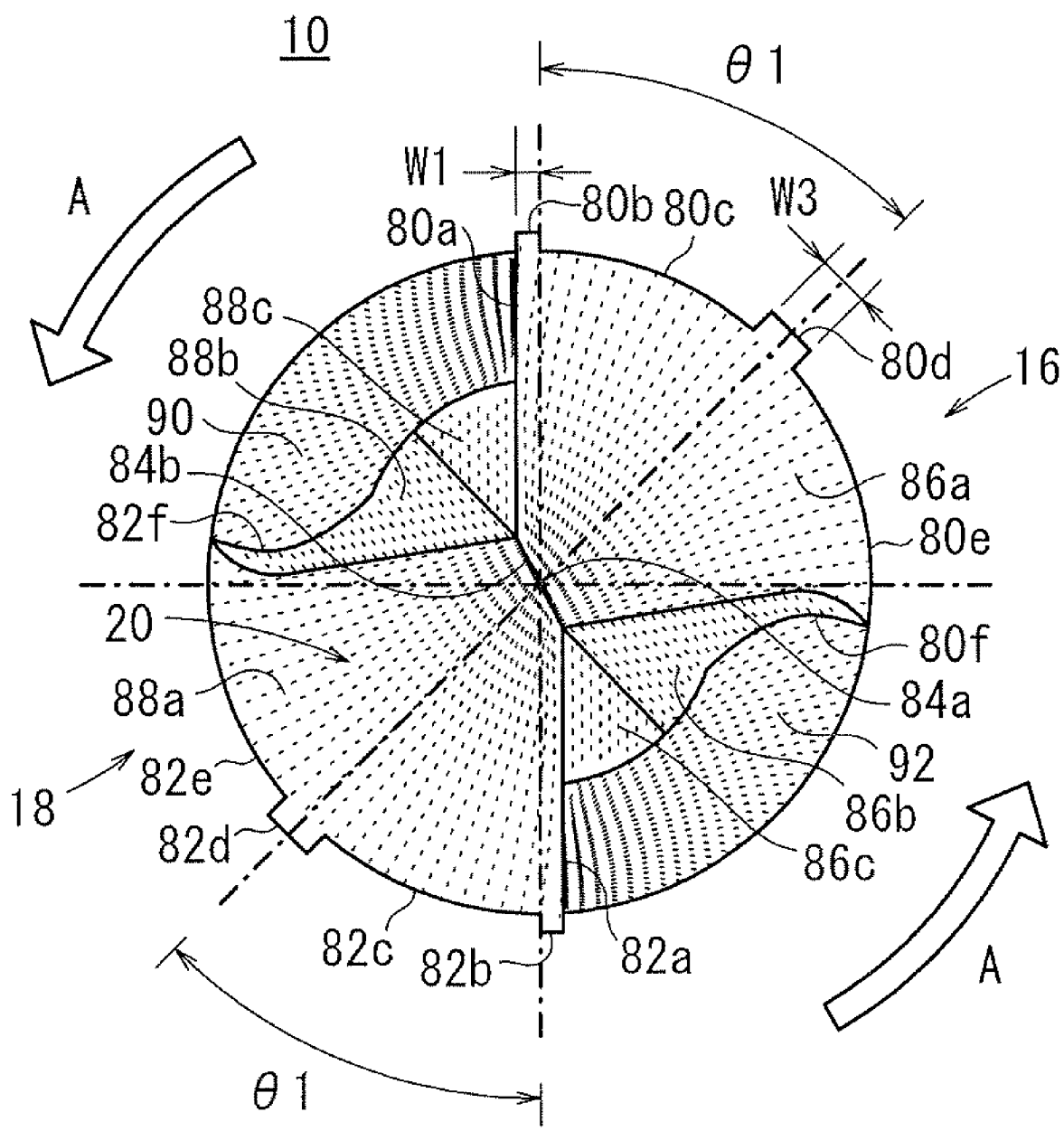
FIG. 9 is a schematic front elevation of the drill shown in FIG. 8.

As shown in FIG. 9, the tip surface 84 is constituted by a first tip inclined surface 86a, a second tip inclined surface 86b, and a third tip inclined surface 86c, which is inclined from the tip 84a (cutting blade ridge 84b) toward the first cutting blade 16, together with a first tip inclined surface 88a, a second tip inclined surface 88b, and a third tip inclined surface 88c, which is inclined toward the second cutting blade 18, so as to define the above-mentioned pyramid.

Further, swarf-discharging grooves 90, 92, for transferring swarfs of a workpiece that is cut by the blade edges 80a and 82a of the cutting blades 16 and 18 toward the shank portion 14 located at the rear side of the blade portion 12, are provided between the cutting blades 16 and 18, extending in a spiral form on the blade portion 12. Specifically, as shown in FIG. 10, the swarf-discharging groove 90 is defined by the blade edge 80a of the cutting blade 16 and the wall surface 82f of the cutting blade 18, so as to discharge swarfs cut mainly by the blade edge 80a. The swarf-discharging groove 92 is defined by the blade edge 82a of the cutting blade 18 and the wall surface 80f of the cutting blade 16, so as to discharge swarfs cut mainly by the blade edge 82a.

In the drill 10 of the present embodiment, a margin width W1 (i.e., the width of the land portion 80b (82b) in the rotary direction) is minimized (to approximately 3% or less of the diameter of the drill 10, for instance) when viewed in front elevation as shown in FIG. 9, and the angle θ2 around the tip 84*a* of the tip surface 84 is 160° or more when viewed in side elevation as shown in FIG. 8, in order to improve processing accuracy and the tool lifetime of the drill 10. Incidentally, the relationship between the margin width W1 of the land portion 80*b* (82*b*) and the width W3 of the pad portion 80*d* (82*d*) is determined so that the total of the margin width W1 and the width W3 becomes, for instance, 20% or less than the total diameter of the drill 10. In other words, the width W3 of the pad portion 80*d* (82*d*) is set to be larger than the margin width W1 of the land portion 80*b* (82*b*).

Functions and effects of the drill 10 according to the present embodiment, which is arranged in the foregoing manner, shall be described below.

Figure 11:
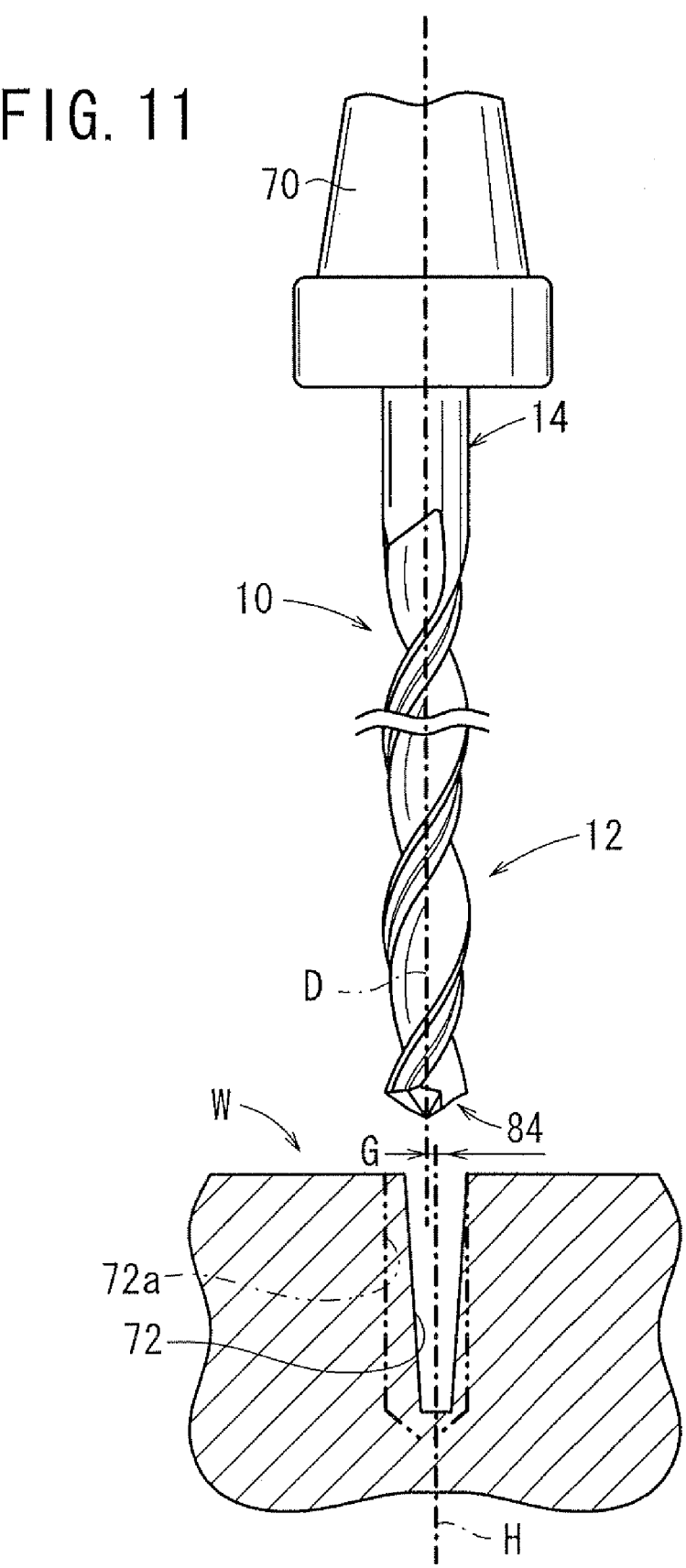
FIG. 11 is an illustration showing how a cast hole in a workpiece is drilled by the drill shown in FIG. 8.

Initially, as shown in FIG. 11, the shank portion 14 of the drill 10 is rigidly attached to the rotary drive source 70 of a machine tool via a chuck mechanism. Then, the rotary drive source 70 is driven in order to rotate the drill 10 at a high speed in the direction of the arrow A as shown in FIG. 9. Subsequently, the tip surface 84 of the drill 10 is directed toward the cast hole 72 provided in the workpiece W, and the drill 10 is displaced along the axial direction thereof to begin cutting the workpiece W. Specifically, the cutting blades 16 and 18 provided on the blade portion 12 start cutting the cast hole 72, whereupon the blade portion 12 is advanced from the tip end thereof into the workpiece W, while drilling a hole having a predetermined diameter around the cast hole 72.

Since the margin width W1 of the land portions 80*b* and 82*b* constituting the cutting blades 16 and 18 is set extremely small in the drill 10 of the present embodiment, the resistance (reaction force) caused by the side wall of the cast hole 72 can effectively be reduced, and the inclination of the drill 10 during cutting of the workpiece can be restrained. Further, the drill 10 is provided with pad portions 80*d* and 82*d* thereon, extending from the land portions 80*b* and 82*b*, and sandwiching the escape portions 80*c* and 82*c* therebetween. In other words, the pad portions 80*d* and 82*d* function as a second land portion, provided subsequent to the land portions 80*b* and 82*b*. Accordingly, the drill 10 can be situated along the side wall of the cast hole 72, on at least four sections (the land portions 80*b* and 82*b*, and the pad portions 80*d* and 82*d*), which significantly improves straightness (straight running stability) when the cutting process is initiated.

Specifically, since the margin width W1 of the land portions 80*b* and 82*b* that are continuous with the cutting blades 80*a* and 82*a* is arranged to be extremely narrow in the drill 10 of the present embodiment, resistance caused by the side wall of the hole can be loosened at the escape portions 80*c* and 82*c*. Further, since the drill 10 is provided with the pad portions 80*d* and 82*d* that are continuous with the escape portions 80*c* and 82*c*, the cutting direction is scarcely deviated upon starting of the cutting process, so that the drill 10 can cut the workpiece while maintaining a straight cutting direction. At this time, since the width W3 of the pad portions 80*d* (82*d*) is set to be greater than the margin width W1 of the land portions 80*b* (82*b*), the drill 10 can be situated securely along the side wall of the cast hole 72 by the pad portions 80*d* (82*d*) having the width W3, while resistance (reaction force) caused by the side wall of the cast hole 72 is effectively reduced with the land portions 80*b* (82*b*) having the small margin width W1, thereby further enhancing straight running stability when the cutting process is initiated.

Further, since the angle θ2 of the tip surface 80 is set at a blunt angle of 160° or more, the cutting reaction force (radial reaction force) in the rotary direction can be effectively reduced, and straight running stability (so-called self-centering ability) in the cutting direction during the cutting process can be improved. Accordingly, the drill 10 can enter into the cast hole 72 more securely and stably.

Accordingly, as shown in FIG. 11, even if an axial direction D of the drill 10 is misaligned with the axial direction H of the cast hole 72, due to a positional deviation G within a tolerable range, the drill 10 can enter into the workpiece straightly, along the axial direction D, without being significantly influenced by the orientation of the cast hole 72. Therefore, even when the casting accuracy of the cast hole 72 is low, drilling of the hole can be conducted at a desired position, and a hole 72*a* (refer to the two-dot chain line shown in FIG. 11) with high processing (positional) accuracy can be cut. In other words, the center distance (error between the processed hole 72*a* and a desired processing position) can be restrained securely, so that any error falls within a standard value. Further, oblique entering of the drill 10 into the cast hole 72, due to the above-described positional deviation G, which tends to cause bending and damage to the drill 10, can effectively be avoided, so that the lifetime of the tool can be prolonged.

Figure 10:
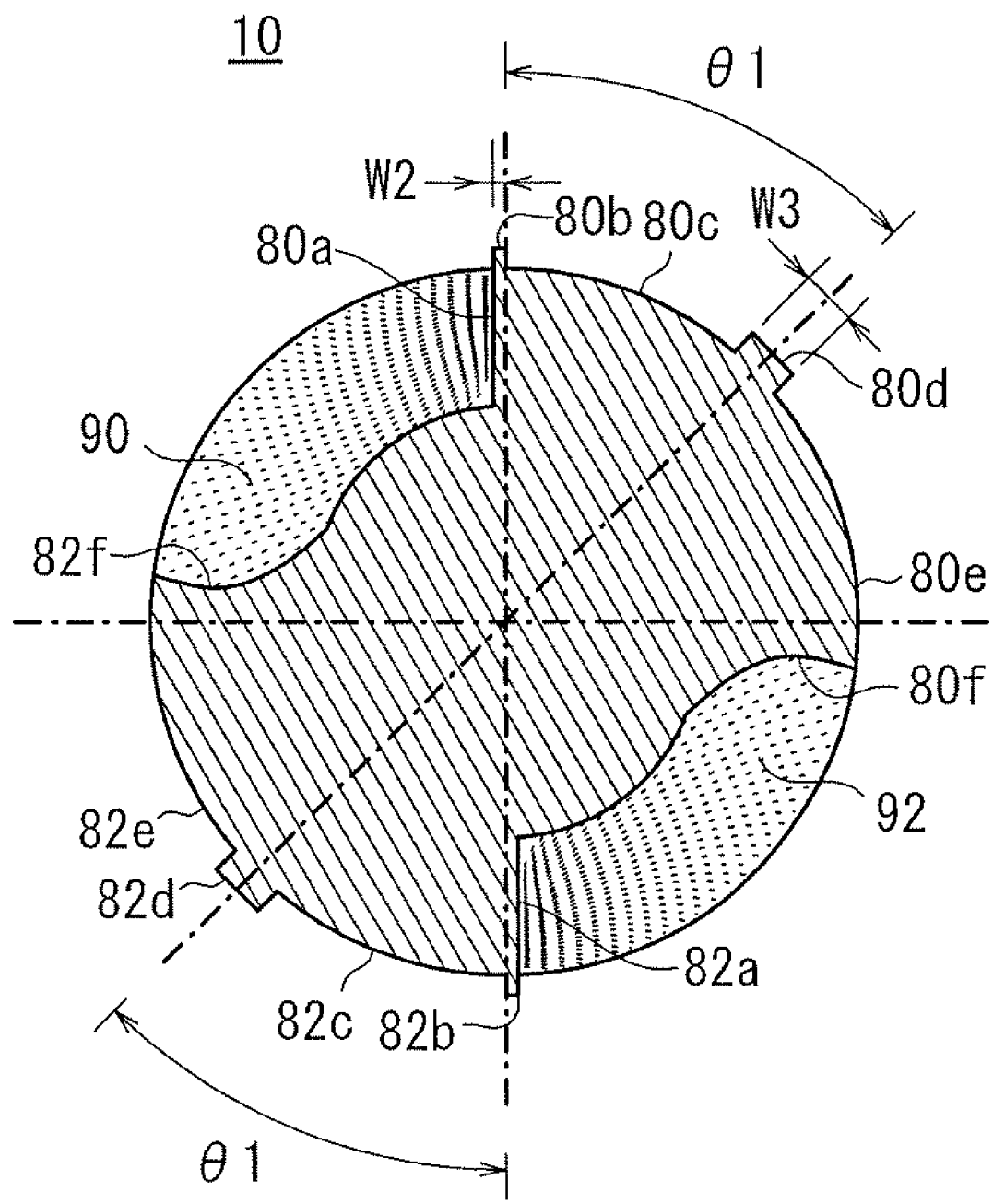
FIG. 10 is a schematic cross section taken along line VIIIB-VIIIB in FIG. 8.

Incidentally, the drill 10 of the present embodiment may be arranged to have a margin width W2 smaller than the margin width W1 at the tip end, at a section spaced apart from the tip end of the blade portion 12 toward the rear end (see FIG. 10). This is because the rear end of the blade portion 12 contributes only slightly to cutting, and the provision of the land portions 80*b* (82*b*) thereon is not required as much in order to improve and stabilize the straight running ability thereof. According to this arrangement, damage to the drill 10 when the drill 10 is inclined can also be prevented. Accordingly, the land portions 80*b* and 82*b* do not have to be provided near the shank portion 14. Alternatively, the margin widths W1 and W2 may be arranged equally to each other.

Although exemplary embodiments have been mentioned above in describing the present invention, it should be understood that various alternative arrangements are possible without departing from the scope of the present invention.

What is claimed is:

1. A drill, comprising:
   a blade portion provided with a spiral cutting blade along a cutting direction from a tip end to a rear end of the blade portion; and
   a shank portion continuous with the rear end of the blade portion,
   the blade portion comprising:
   a distal-side cutting blade formed from the tip end of the blade portion along the cutting direction at a constant first torsion angle;
   an intermediate groove formed continuously with the distal-side cutting blade along the cutting direction, the intermediate groove gradually varying a torsion angle thereof from the first torsion angle to a second torsion angle along the cutting direction; and
   a rear-side groove formed continuously with the intermediate groove along the cutting direction at the second torsion angle,
   wherein the torsion angle of the intermediate groove is greater than the first torsion angle and smaller than the second torsion angle,
   wherein the rear-side groove occupies a greater length in the cutting direction than the distal-side cutting blade, and
   wherein the drill is provided with an oil passage that penetrates axially through the drill from a tip end to a rear end of the drill, the oil passage being constituted by a single channel extending from the shank portion to a section formed with the intermediate groove, and which branches into two channels at the section formed with the intermediate groove, so as to open at two positions at a tip surface of the blade portion.

2. The drill according to claim 1, wherein a diamond is provided on a tip end of the blade portion.

* * * * *